US012759124B2

(12) United States Patent
King et al.

(10) Patent No.: US 12,759,124 B2
(45) Date of Patent: Oct. 13, 2026

(54) SYSTEMS, APPARATUSES, AND METHODS FOR INSTALLING A TEMPORARY FASTENER IN AN ASSEMBLY

(71) Applicant: The Boeing Company, Arlington, VA (US)

(72) Inventors: Evan M. King, St. Louis, MO (US); Ike C. Schevers, St. Louis, MO (US); David L. Fritsche, St. Louis, MO (US)

(73) Assignee: The Boeing Company, Arlington, VA (US)

( * ) Notice: Subject to any disclaimer, the term of this patent is extended or adjusted under 35 U.S.C. 154(b) by 182 days.

(21) Appl. No.: 18/755,825

(22) Filed: Jun. 27, 2024

(65) Prior Publication Data

US 2024/0342886 A1 Oct. 17, 2024

Related U.S. Application Data

(62) Division of application No. 17/727,931, filed on Apr. 25, 2022, now Pat. No. 12,048,990.

(51) Int. Cl.
*B25B 31/00* (2006.01)
*B64F 5/10* (2017.01)

(52) U.S. Cl.
CPC .............. *B25B 31/005* (2013.01); *B64F 5/10* (2017.01)

(58) Field of Classification Search
CPC ......... B25B 31/00; B25B 31/005; B23Q 3/00; B23Q 3/06
See application file for complete search history.

(56) References Cited

U.S. PATENT DOCUMENTS

| | | | | |
|---|---|---|---|---|
| 1,641,809 | A | 9/1927 | Guenthart | |
| 3,180,389 | A | 4/1965 | Charles | |
| 6,526,641 | B1 | 3/2003 | Latham | |
| 8,585,336 | B2 | 11/2013 | Tao et al. | |
| 9,636,740 | B1 | 5/2017 | Nikkel | |
| 10,161,430 | B2 * | 12/2018 | He | F16B 5/0208 |
| 11,519,191 | B2 * | 12/2022 | Bauza | B66F 15/00 |
| 12,048,990 | B2 * | 7/2024 | King | B25B 31/005 |
| 2004/0187284 | A1 | 9/2004 | Draggie et al. | |
| 2011/0081218 | A1 | 4/2011 | Wang | |
| 2015/0298825 | A1 | 10/2015 | Cole et al. | |
| 2019/0160508 | A1 * | 5/2019 | Otsuka | B21D 45/06 |
| 2023/0339086 | A1 * | 10/2023 | King | B25B 31/005 |

* cited by examiner

*Primary Examiner* — Lee D Wilson
(74) *Attorney, Agent, or Firm* — Massey Bean & Lewis

(57) ABSTRACT

An example system includes: an apparatus comprising: a temporary fastener having a stem configured to be inserted through as assembly and be retained to the assembly, and a spring mounted about the stem. The system also includes a linear actuator configured to apply a force on the spring, thereby causing the spring to be compressed against the assembly and apply a predetermined clamping force to the assembly.

11 Claims, 11 Drawing Sheets

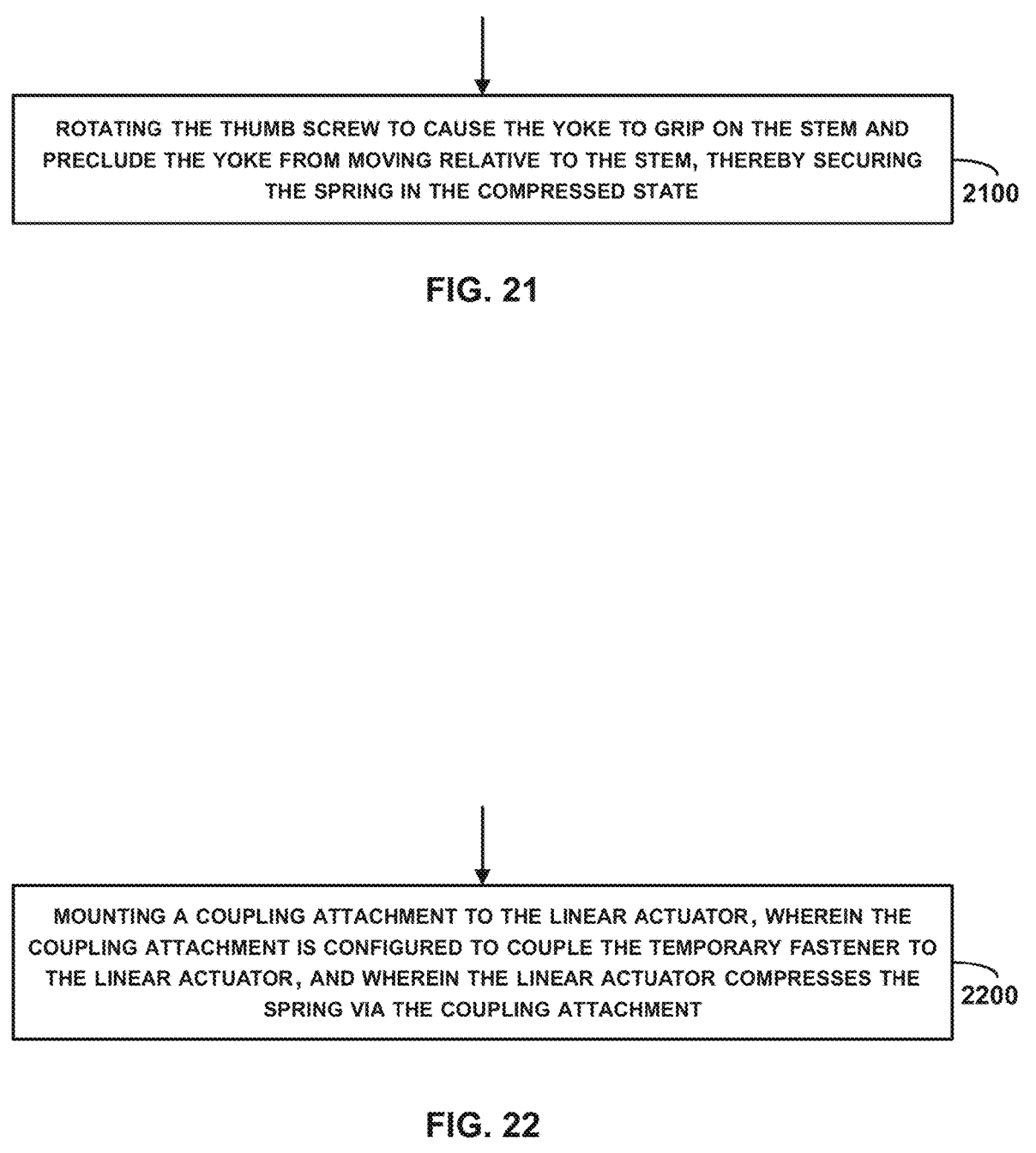

ROTATING THE THUMB SCREW TO CAUSE THE YOKE TO GRIP ON THE STEM AND PRECLUDE THE YOKE FROM MOVING RELATIVE TO THE STEM, THEREBY SECURING THE SPRING IN THE COMPRESSED STATE

2100

FIG. 21

MOUNTING A COUPLING ATTACHMENT TO THE LINEAR ACTUATOR, WHEREIN THE COUPLING ATTACHMENT IS CONFIGURED TO COUPLE THE TEMPORARY FASTENER TO THE LINEAR ACTUATOR, AND WHEREIN THE LINEAR ACTUATOR COMPRESSES THE SPRING VIA THE COUPLING ATTACHMENT

2200

FIG. 22

SYSTEMS, APPARATUSES, AND METHODS FOR INSTALLING A TEMPORARY FASTENER IN AN ASSEMBLY

CROSS REFERENCE TO RELATED APPLICATION

The present application is a divisional of U.S. patent application Ser. No. 17/727,931 filed on Apr. 25, 2022, the entire contents of which are herein incorporated by reference as if fully set forth in this description.

FIELD

The field of the present disclosure relates generally to manufacturing assemblies using temporary fasteners and, more specifically, to systems, apparatuses, and methods of installing or mounting a temporary fastener to an assembly, applying a predetermined clamping force, checking the assembly, and removal of the temporary fastener.

BACKGROUND

In some manufacturing applications, a panel is attached to a substructure to form a component or section of an assembly. As an example for illustration, in aircraft assemblies, a panel, i.e., a skin of the aircraft, is attached to a substructure component such as a longeron, a stringers, a bulkhead, or a frame. The substructure reinforces the skin of the aircraft and maintains a cross-sectional shape of a fuselage section and/or wing structure.

In such applications, it may be desirable to position the panel on the substructure and check whether there are gaps therebetween before permanently fastening the panel to the substructure. Thus, temporary fasteners may be used to couple the panel to the substructure and check for gaps.

It may be desirable to apply a range of clamping forces via a temporary fastener at various sections of the panel to check whether there are gaps. For instance, one part of the panel/substructure may require a force of 25 pound-force (lbs), another part may require 75 lbs, a third part may require 100 lbs, and so on.

A hexagonal bolt that is torqued via a wrench could be used as a temporary fastener. However, the torque applied to the nut of the bolt can be larger than the required range of clamping force, and thus a torque wrench and hexagonal bolt might not be suitable for application where achieving a particular range of clamping force is desirable.

In another approach, a Cleco fastener might be used. A Cleco fastener is a spring-based fastener. However, the spring is rated to a particular force (e.g., 25 lbs) and is not adjustable, and is thus not suitable for applications in which a range of clamping forces is to be used.

Another approach involves using a push pull gage. In this approach, a range of clamping forces is applied by the hand of a user. However, such approach does not generate accurate clamping forces and is not ergonomic.

It may thus be desirable to have a temporary fastener where an accurate range of clamping forces can be applied in an ergonomic manner. It is with respect to these and other considerations that the disclosure made herein is presented.

SUMMARY

The present disclosure describes examples that relate to systems, apparatuses, and methods for installing a temporary fastener in an assembly.

In one aspect, the present disclosure describes a system. The system includes: an apparatus comprising: a temporary fastener having a stem configured to be inserted through as assembly and be retained to the assembly, and a spring mounted about the stem; and a linear actuator configured to apply a force on the spring, thereby causing the spring to be compressed against the assembly and apply a predetermined clamping force to the assembly.

In another aspect, the present disclosure describes an apparatus. The apparatus includes: a temporary fastener having a stem configured to be inserted through as assembly and be retained to the assembly; a spring mounted about the stem; a first washer disposed about the stem at a first end of the spring, wherein the stem is disposed through the first washer; a second washer configured to be disposed between a second end of the spring and the assembly, wherein the stem is disposed through the second washer, wherein as the first washer moves, the first washer compresses the spring against the second washer mounted to the assembly, thereby applying a predetermined clamping force to the assembly; and a spring locking device configured to secure the spring in a compressed state to maintain the predetermined clamping force.

In another aspect, the present disclosure describes method. The method includes: inserting a stem of a temporary fastener through an assembly, wherein the temporary fastener comprises a fastener head coupled to the stem, and wherein a spring is mounted about the stem; mounting a fastener retainer element to an end of the stem on a first side of the assembly to retain the temporary fastener to the assembly, wherein the spring is disposed on a second side of the assembly opposite the first side; coupling a linear actuator to the fastener head; actuating the linear actuator to (i) apply a pulling force on the temporary fastener, thereby applying the pulling force on the assembly via the fastener retainer element, and (ii) compress the spring against the assembly, thereby causing the spring to apply a predetermined clamping force on the assembly; and operating a spring locking device to lock the spring in a compressed state and maintain the predetermined clamping force applied to the assembly.

The foregoing summary is illustrative only and is not intended to be in any way limiting. In addition to the illustrative aspects, examples, and features described above, further aspects, examples, and features will become apparent by reference to the figures and the following detailed description.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying Figures.

FIG. 21 is a flowchart of additional operations performed with the method of FIG. 17, in accordance with an example implementation.

FIG. 22 is a flowchart of additional operations performed with the method of FIG. 17, in accordance with an example implementation

DETAILED DESCRIPTION

Disclosed examples will now be described more fully hereinafter with reference to the accompanying drawings, in which some, but not all of the disclosed examples are shown. Indeed, several different examples may be described and should not be construed as limited to the examples set forth herein. Rather, these examples are described so that this disclosure will be thorough and complete and will fully convey the scope of the disclosure to those skilled in the art.

Within examples, described herein are systems, apparatuses, and methods associated with applying a range of clamping force to an assembly. Particularly, a spring-based temporary fastener is disclosed. The clamping force applied to the assembly is achieved via compression of the spring, not tensile force in a bolt. The disclosed temporary fastener can be used in applications wherein a nut is installed at the back side of a target joint (e.g., back side of a substructure to which a panel is to be attached).

The spring is compressed via a linear actuator. In a disclosed example, the linear actuator comprises a pneumatic or hydraulic cylinder where pressurized fluid is used to apply a force on the spring. For instance, an air regulator can be used to provide air or gas at a particular pressure to compress the spring, and the spring in turn applies particular desired clamping force based on the pressure level of the air/gas. Varying the pressure level of air varies the clamping force as desired. Notably, the clamping force is not dependent on the spring constant, but is rather a function of the pressure of the fluid. In other examples, different types of linear actuators could be used.

Figure 1:
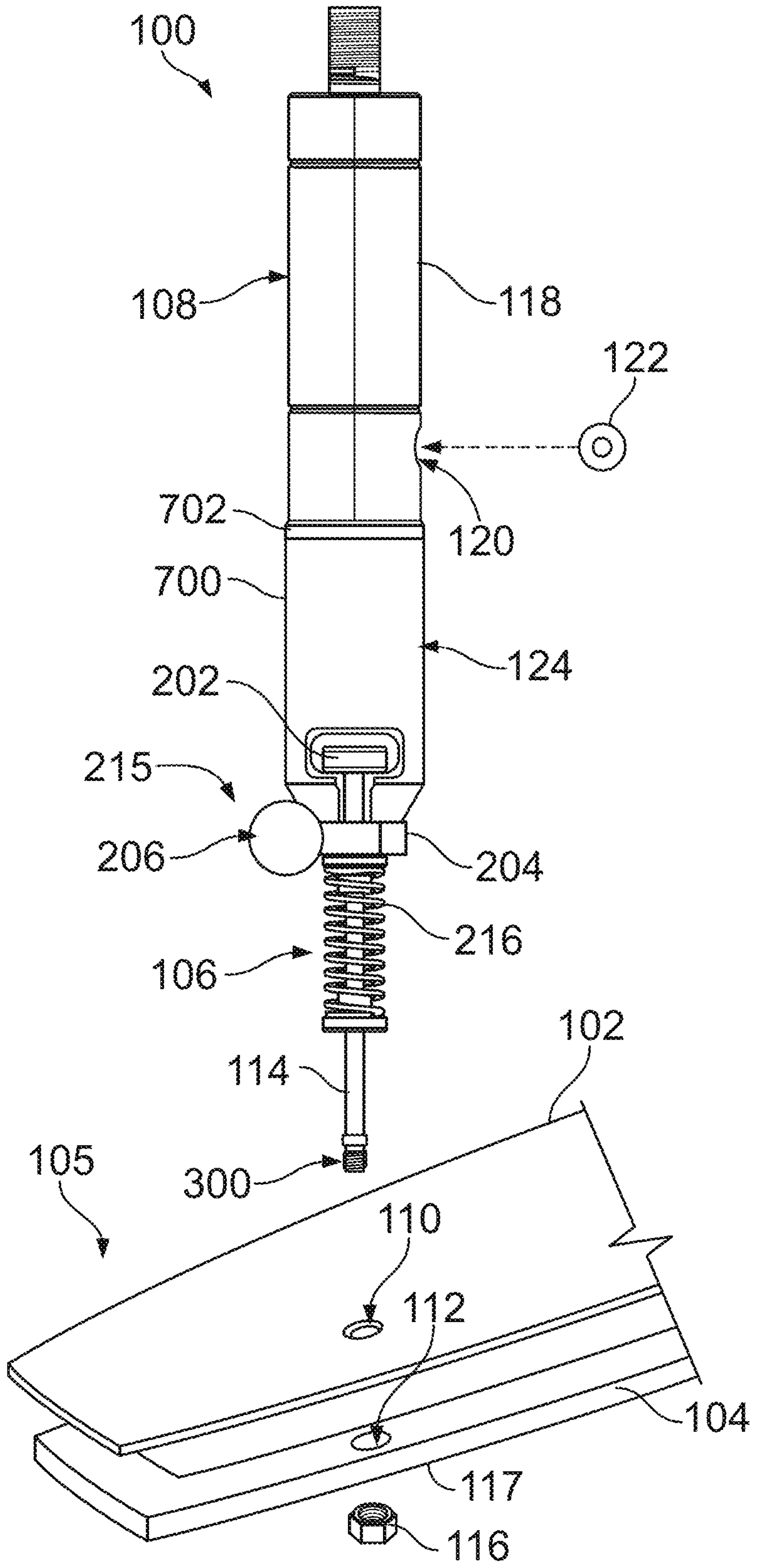
FIG. 1 illustrates a system 100 to temporarily fasten a panel to a substructure with a particular clamping force, in accordance with an example implementation.

FIG. 1 illustrates a system 100 configured to temporarily fasten a panel 102 to a substructure 104 with a particular clamping force, in accordance with an example implementation. The panel 102 and the substructure 104 form an assembly 105.

As an example for illustration, the panel 102 can be a portion of a skin of an aircraft, and the substructure 104 can be longeron, a stringers, a bulkhead, or a frame of the aircraft. Prior to permanently fastening the panel 102 to the substructure 104, it may be desirable to check whether a gap exists between the panel 102 and the substructure 104. If there is a gap or if the gap is larger than a threshold gap, the parts may be rejected from a quality control perspective.

As such, a particular clamping force is applied to the panel 102 and the substructure 104, and the assembly of the panel 102 and the substructure 104 is then checked for gaps, prior to permanently fastening the panel 102 to the substructure 104. Different portions of the panel 102 and the substructure 104 or different panel/substructure sections may require different clamping forces. As an example for illustration, it may be desirable to be able to change the clamping force between 25 lbs and 100 lbs, based on which panel/substructure or which portion of a panel/substructure assembly is being checked.

The system 100 includes an apparatus 106 and a linear actuator 108 configured to apply a desired clamping force in a range of clamping forces to temporarily assemble the panel 102 and the substructure 104 and check for gaps. Particularly, the panel 102 has a hole 110, and the substructure 104 has a hole 112 corresponding to and aligned with the hole 110 of the panel 102. The apparatus 106 has a stem 114 that is inserted through the holes 110, 112, and then a fastener retainer element 116 (e.g., a nut) is used to secure the stem 114 to a first side or a back side 117 of the substructure 104. In other words, the fastener retainer element 116 is used to affix the stem 114 to the assembly 105.

The linear actuator 108 is then used as described below to apply a particular clamping force on the panel 102 and the substructure 104. Then, the assembly 105 of the panel 102 and the substructure 104 being clamped together is checked for gaps therebetween. After the assembly 105 is checked for gaps, the apparatus 106 can be removed, and a permanent fastener can be used.

Figure 2:
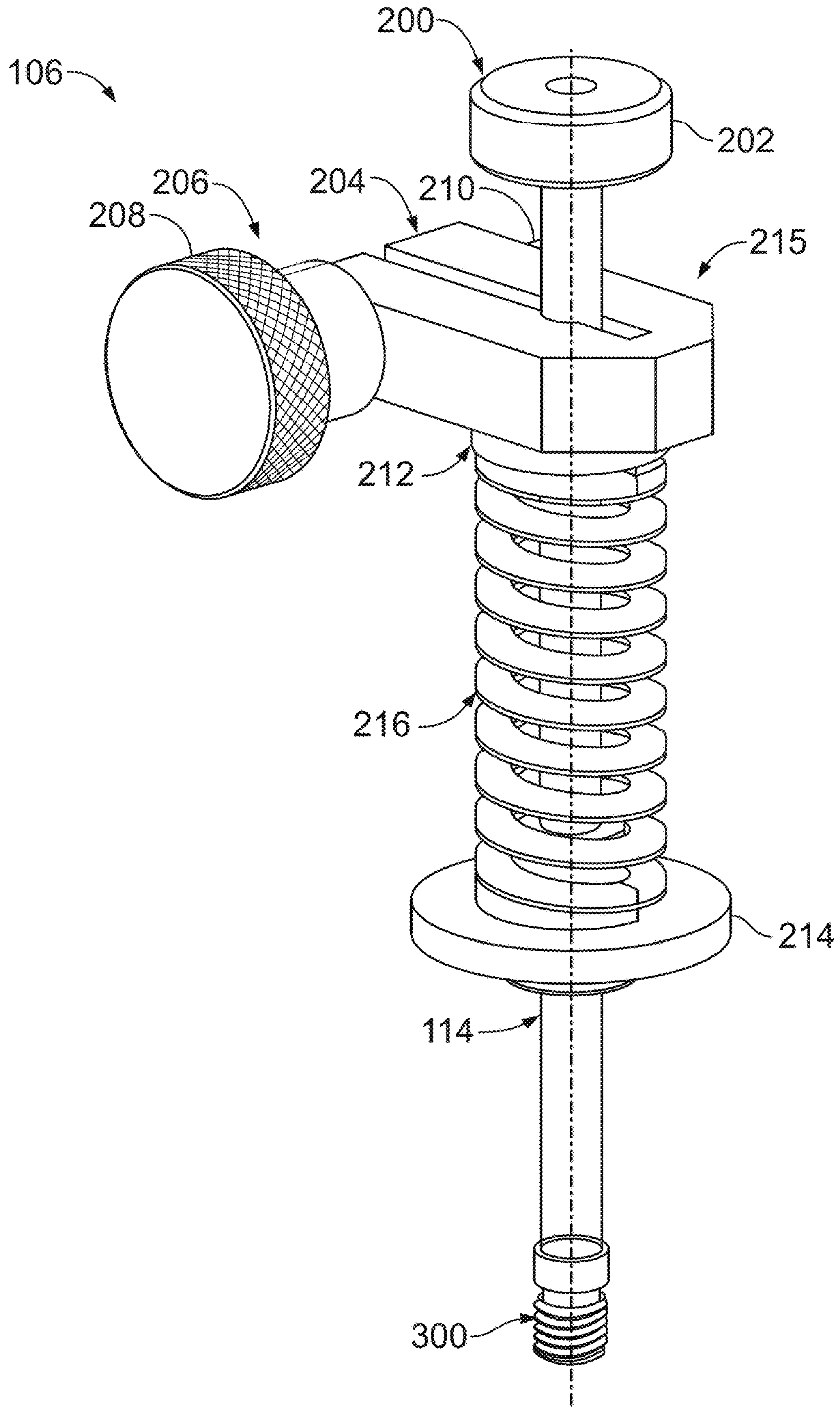
FIG. 2 illustrates a perspective view of an apparatus including a temporary fastener, in accordance with an example implementation.

FIG. 2 illustrates a perspective view of the apparatus 106 including a temporary fastener 200, in accordance with an example implementation. The temporary fastener 200 has a fastener head 202 coupled to the stem 114. The apparatus 106 also includes a yoke 204 disposed about the stem 114 of the temporary fastener 200.

The apparatus 106 includes thumb screw 206 having a knob 208 and a screw 210 that extends through legs of the yoke 204. By turning the knob 208, the screw 210 can tighten or relax the grip of the yoke 204 on the stem 114.

The apparatus 106 further includes a first washer 212 interfacing with the yoke 204, and also includes a second washer 214. The apparatus 106 also includes a biasing element such as spring 216 interposed between the first washer 212 and the second washer 214. The spring 216 is configured to be mounted on a second side of the assembly 105 opposite the back side 117 of the assembly 105.

The yoke 204 and the thumb screw 206 form a spring locking device 215 that can secure the spring 216 in a particular state. For example, as described below, when the spring 216 is compressed, the spring locking device 215 is used to secure the spring 216 in a compressed state or compressed position.

The spring locking device 215 including the thumb screw 206 and the yoke 204 is an example locking device for illustration. Other mechanisms or devices can be used. For example, a locking pin can be used to retain the spring 216 in a particular compressed state. In another example, the thumb screw can be driven into the stem 114 rather than the yoke 204. Any type of clamping stop, set screw, or any other means to stop to the stem 114 once in position can be used as a locking device.

Figure 3:
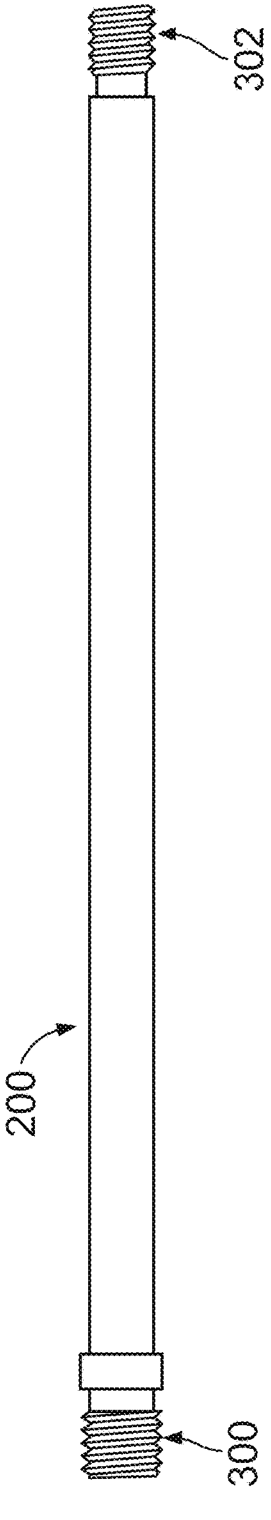
FIG. 3 illustrates a side view of a stem of a temporary fastener, in accordance with an example implementation.

FIG. 3 illustrates a side view of the stem 114 of the temporary fastener 200, in accordance with an example implementation. As shown, the stem 114 is generally cylindrical in shape and includes a first threaded end 300 and a second threaded end 302.

The fastener retainer element 116 shown in FIG. 1 is threadedly-coupled to the stem 114 via the first threaded end 300 to retain or affix the temporary fastener 200 to the assembly 105 of the panel 102 and substructure 104. The fastener head 202 is also generally cylindrical and has internal threads configured to engage with the second threaded end 302 of the stem 114 to couple the fastener head 202 to the stem 114.

Figure 4:
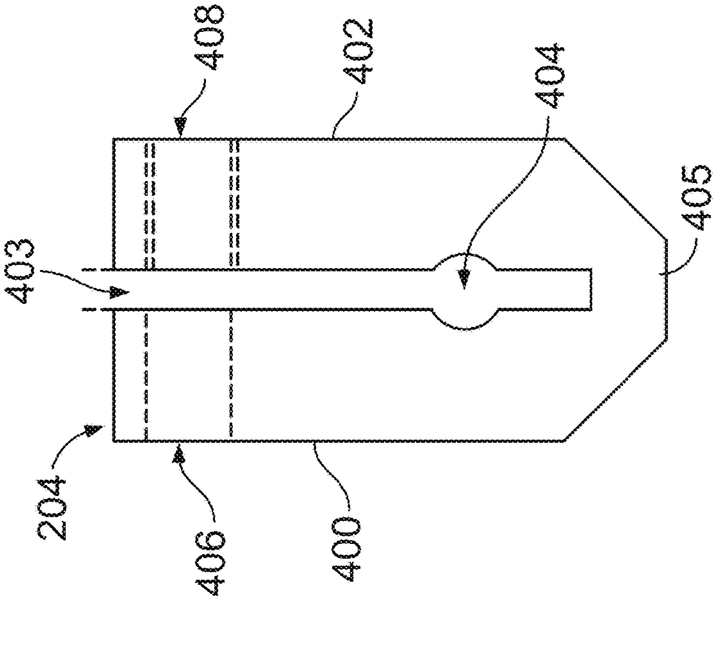
FIG. 4 illustrates a top view of a yoke of the apparatus of FIG. 2, in accordance with an example implementation.

FIG. 4 illustrates a top view of the yoke 204, in accordance with an example implementation. The yoke 204 is generally U-shaped and has two generally parallel and laterally disposed leg portions: a first leg portion 400 and a second leg portion 402, with a gap 403 formed therebetween. The gap 403 enlarges at a particular portion of the yoke 204 to form a circular hole 404 that accommodates the stem 114 of the temporary fastener 200. The yoke 204 also includes a connecting portion 405 that couples or connects the leg portions 400, 402 to each other.

The first leg portion 400 has a hole 406, and the second leg portion 402 has a respective hole 408 that is aligned with the hole 406. In an example, one or both of the holes 406, 408 may be threaded. For instance, the hole 408 can be a threaded hole, such that threads of the screw 210 engage with the threads of the hole 408.

With this configuration, when the knob 208 of the thumb screw 206 is turned in one direction (e.g., clockwise), the thumb screw 206 moves the first leg portion 400 toward the second leg portion 402 or vice versa to reduce the gap 403 and grip on the stem 114 disposed through the circular hole 404. This way, the yoke 204 and the stem 114 might not move relative to each other. Conversely, when the knob 208 of the thumb screw 206 is turned in the opposite direction (e.g., counter-clockwise), the thumb screw 206 moves the first leg portion 400 away from the second leg portion 402 to relax the grip of the yoke 204 on the stem 114, and allow the yoke 204 to move relative to the stem 114.

Figure 5:
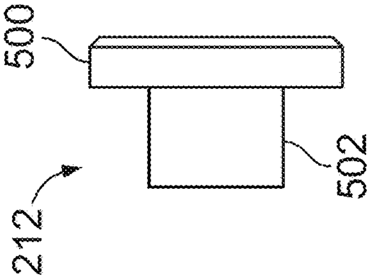
FIG. 5 illustrates a side view of a first washer, in accordance with an example implementation.

FIG. 5 illustrates a side view of the first washer 212, in accordance with an example implementation. The first washer 212 is generally cylindrical in shape and is hollow to accommodate the stem 114 therethrough.

The first washer 212 has a flanged portion 500 configured as a projecting rim or edge against which a first end of the spring 216 (e.g., top end of the spring 216 in FIG. 2) rests. The first washer 212 also has a cylindrical protrusion 502 about which a portion of the spring 216 is disposed. The cylindrical protrusion 502 thus operates as a guide for the spring 216 and retains the spring 216 laterally.

Figure 6:
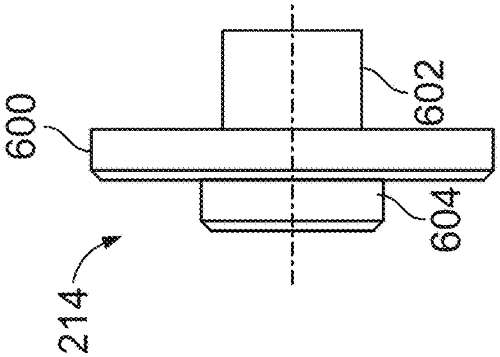
FIG. 6 illustrates a side view of a second washer, in accordance with an example implementation.

FIG. 6 illustrates a side view of the second washer 214, in accordance with an example implementation. Similar to the first washer 212, the second washer 214 is generally cylindrical in shape and is hollow to accommodate the stem 114 therethrough.

The second washer 214 has a flanged portion 600 configured as a projecting rim or edge against which a second end of the spring 216 (e.g., bottom end of the spring 216 in FIG. 2) rests. The second washer 214 also has a cylindrical protrusion 602 on one side of the flanged portion 600. A portion of the spring 216 is disposed about the cylindrical protrusion 602 such that the cylindrical protrusion 602 operates as a guide for the spring 216 and retains the spring 216 laterally.

Further, the second washer 214 has another cylindrical protrusion 604 on the other side of the flanged portion 600. The cylindrical protrusion 604 is configured to interface with the panel 102 when the apparatus 106 temporarily fastens the panel 102 to the substructure 104.

In the example implementation shown in FIG. 1, the linear actuator 108 is configured as a fluid-driven actuator, e.g., a pneumatic or hydraulic cylinder actuator. A fluid-driven cylinder actuator is used herein as an example for illustration only to describe operation of the system 100. However, it should be understood that other types of linear actuators such as a linear motor, a solenoid actuator, a ball screw motor, etc. can be alternatively used.

The linear actuator 108 has an actuator cylinder 118 and a piston (now shown) disposed within the actuator cylinder 118. The piston may have a piston head and a piston rod extending from the piston head along a central longitudinal axis direction of the actuator cylinder 118. The piston head divides the inner space of the actuator cylinder 118 into a first chamber and a second chamber.

The linear actuator 108 has an inlet port 120 configured to receive fluid (e.g., hydraulic fluid, air, gas, etc.) from a source 122 of fluid (e.g., a pump, an accumulator, a compressor, etc.). Air is used here in as an example fluid. However, it should be understood that other types of fluid (e.g., gas or hydraulic oil) can be used.

The source 122 provides pressurized air through the inlet port 120 to within the actuator cylinder 118 to apply a particular force on the piston disposed within the actuator cylinder 118. The system 100 includes a coupling attachment 124 that is attached the linear actuator 108 and configured to couple the apparatus 106 to the linear actuator 108. The coupling attachment 124 is configured to transmit the fluid force applied to the piston to the first washer 212 of the apparatus 106, thereby compressing the spring 216 against the panel 102 and applying a clamping force to the assembly 105 of the panel 102 and the substructure 104.

Figure 7:
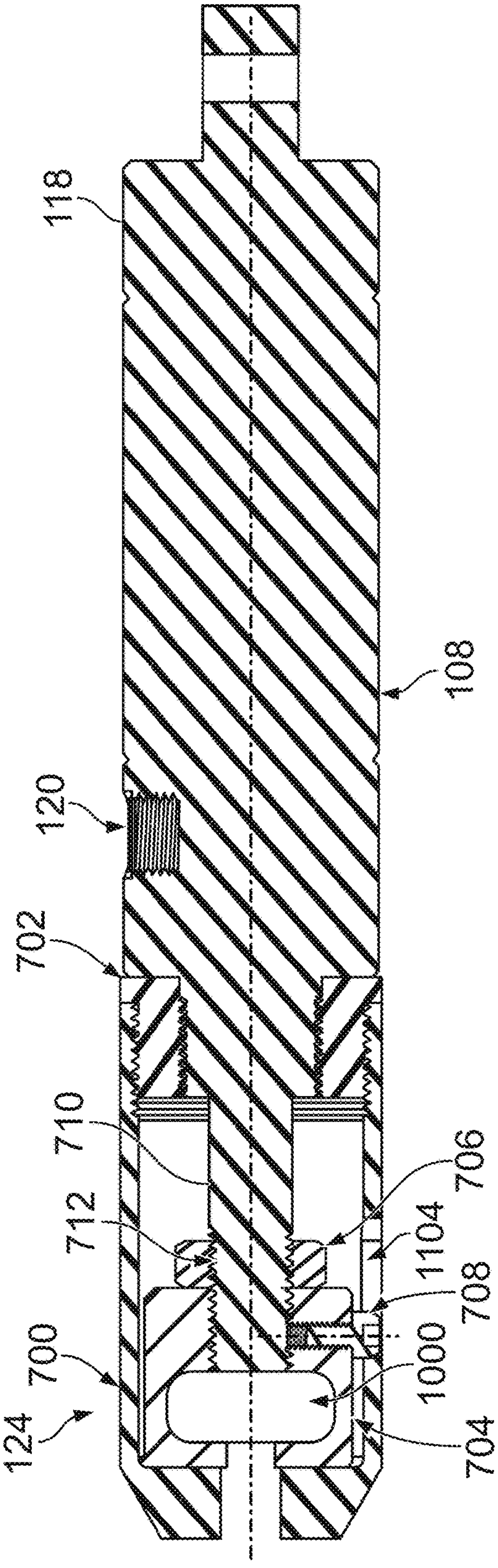
FIG. 7 illustrates a partial side cross-section view of a linear actuator and a coupling attachment, in accordance with an example implementation.

FIG. 7 illustrates a partial side cross-section view of the linear actuator 108 and the coupling attachment 124, in accordance with an example implementation. The coupling attachment 124 includes an attachment cylinder 700, a ring 702, a piston coupler 704, a nut 706, and a screw 708. The piston coupler 704 is coupled to a piston rod 710 of a piston of the linear actuator 108. Particularly, as shown in FIG. 7, the piston rod 710 is disposed partially within the attachment cylinder 700 to be coupled to the piston coupler 704.

In FIG. 7, interior details of the linear actuator 108 are not shown to reduce visual clutter in the drawing. However, as would be understood by a person with skill in the art, the linear actuator 108 includes the actuator cylinder 118 and a piston having the piston rod 710 is disposed within the actuator cylinder 118. The actuator cylinder 118 and the piston rod 710 are movable relative to each other when fluid is introduced through the inlet port 120.

Figure 8:
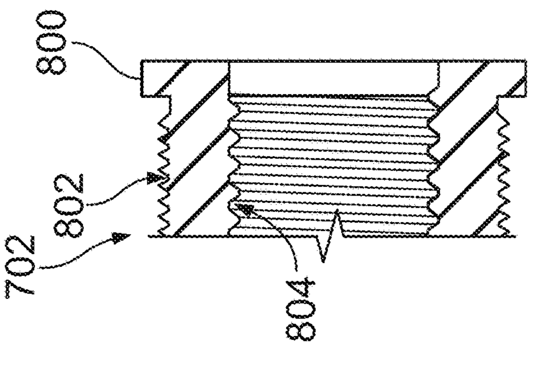
FIG. 8 illustrates cross-sectional side view of a ring, in accordance with an example implementation.

FIG. 8 illustrates a cross-sectional side view of the ring 702, in accordance with an example implementation. The ring 702 has a flanged portion 800, external threads 802, and internal threads 804. The ring 702 is threadedly-engaged to the attachment cylinder 700 via the external threads 802. Further, the ring 702 is threadedly-engaged with the actuator cylinder 118 of the linear actuator 108 via the internal threads 804. With this configuration, the attachment cylinder 700 is coupled to the actuator cylinder 118 via the ring 702 such that if the actuator cylinder 118 moves, the attachment cylinder 700 moves therewith. The flanged portion 800 is configured as a shoulder against which the end of the attachment cylinder 700 rests.

Figure 9:
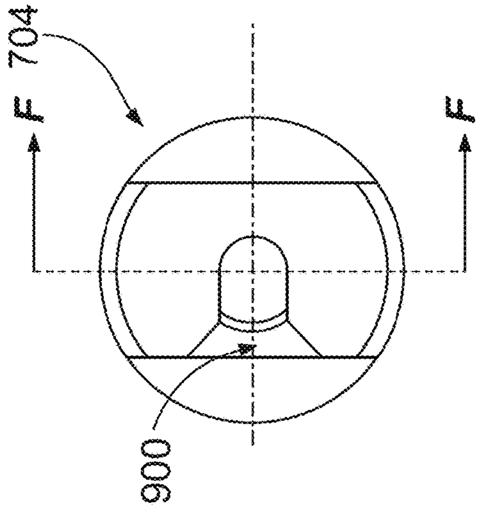
FIG. 9 illustrates a front view of a piston coupler, in accordance with an example implementation.
Figure 10:
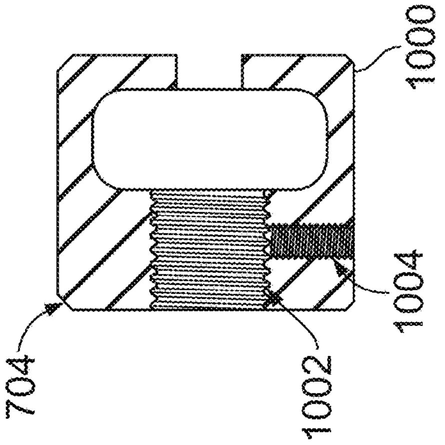
FIG. 10 illustrates a cross-sectional side view of the piston coupler labeled as F-F in FIG. 9, in accordance with an example implementation.

FIG. 9 illustrates a front view of the piston coupler 704, and FIG. 10 illustrates a cross-sectional side view of the piston coupler 704 labeled as F-F in FIG. 9, in accordance with an example implementation. The piston coupler 704 has an opening 900 and an annular groove 1000. The opening 900 allows the fastener head 202 of the temporary fastener 200 to be inserted laterally through the opening 900 to be received within the annular groove 1000, which is configured as a receptacle for the fastener head 202.

The piston coupler 704 has internal threads 1002. Referring to FIGS. 7 and 10 together, the piston rod 710 of the linear actuator 108 can have external threads 712 corresponding to the internal threads 1002 of the piston coupler 704. As such, the piston coupler 704 can be threadedly-coupled to the piston rod 710 via the internal threads 1002 engaging with the external threads 712. The nut 706 also engages the external threads 712 of the piston rod 710 and abuts against the piston coupler 704 to retain the piston coupler 704 axially at a particular position relative to the piston rod 710.

The piston coupler 704 can further have a threaded hole 1004 through which the screw 708 can be disposed. As described below, the screw 708 is configured to operate as a stop for the attachment cylinder 700.

Figure 12:
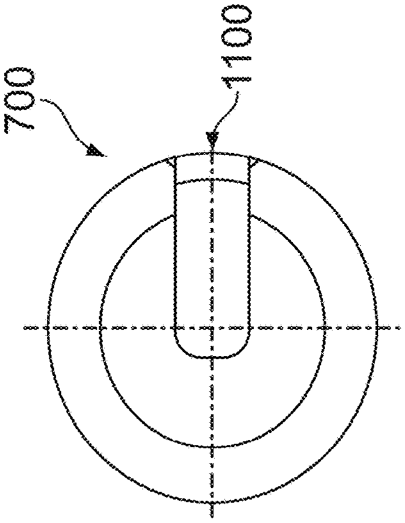
FIG. 12 illustrates a front view of the attachment cylinder of FIG. 11, in accordance with an example implementation.
Figure 11:
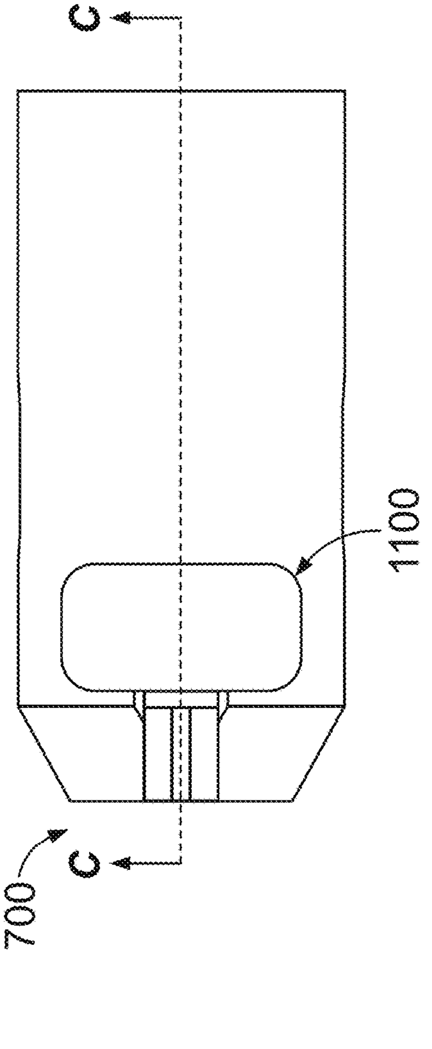
FIG. 11 illustrates a side view of an attachment cylinder, in accordance with an example implementation.
Figure 13:
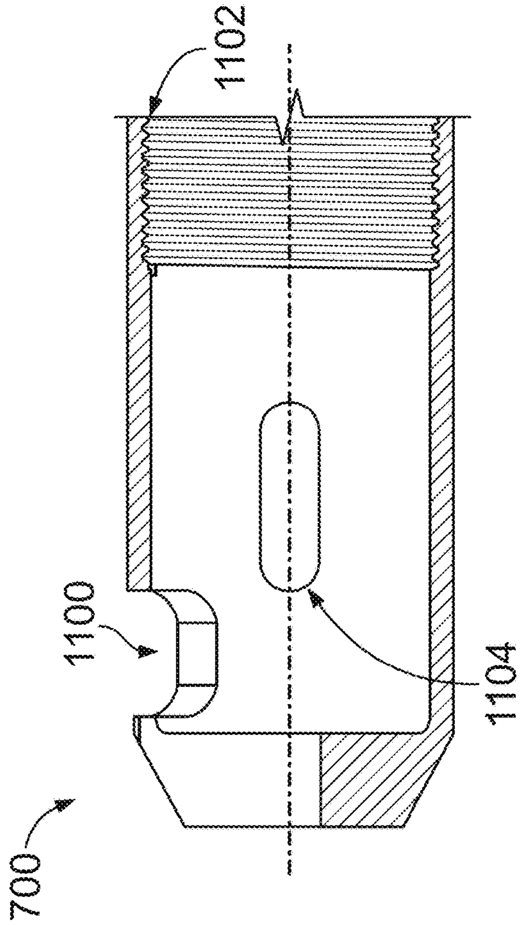
FIG. 13 illustrates a cross-sectional bottom view of the attachment cylinder labeled as C-C in FIG. 11, in accordance with an example implementation.

FIG. 11 illustrates a side view of the attachment cylinder 700, FIG. 12 illustrates a front view of the attachment cylinder 700, and FIG. 13 illustrates a cross-sectional bottom view of the attachment cylinder 700 labeled as C-C in FIG. 11, in accordance with an example implementation. The attachment cylinder 700 has a slot 1100 (e.g., a Tee-shaped slot) that is aligned with the opening 900 of the piston coupler, and is configured to allow the fastener head 202 to be inserted laterally therethrough.

The attachment cylinder 700 further includes internal threads 1102 that are configured to engage with the external threads 802 of the ring 702 to couple the attachment cylinder 700 to the ring 702. The attachment cylinder 700 further includes a longitudinal slot 1104 through which the screw 708 is disposed.

As described below, the attachment cylinder 700 is configured to move axially (e.g., to the left in FIG. 7) when pressurized fluid is provided through the inlet port 120 of the linear actuator 108. The attachment cylinder 700 can move axially until the end of the longitudinal slot 1104 reaches the screw 708. As such, the screw 708 operates as a stop for the attachment cylinder 700.

To mount the coupling attachment 124 to the linear actuator 108, the ring 702 of the coupling attachment 124 can first be threaded to the actuator cylinder 118 of the linear actuator 108, and the nut 706 can then be mounted to the piston rod 710 and moved axially to provide space for the piston coupler 704, which can then be threadedly-engaged with the piston rod 710. The attachment cylinder 700 can then be threadedly engaged with the ring 702, and the screw 708 can then be inserted through the longitudinal slot 1104 of the attachment cylinder 700 and through the threaded hole 1004 of the piston coupler 704. This way, the coupling attachment 124 is coupled to the linear actuator 108.

Operation of the system 100 is described next with reference FIGS. 1, 2, and 7. The stem 114 of the temporary fastener 200 of the apparatus 106 can be inserted through the hole 110 of the panel 102 and through the hole 112 of the substructure 104. The fastener retainer element 116 can then be threadedly engaged with the threaded end 300 of the stem 114 such that the stem 114 is retained to the assembly 105 of the panel 102 and the substructure 104 and the stem 114 is precluded from moving longitudinally (e.g., precluded from moving upward in FIG. 1).

Then, the linear actuator 108 and the coupling attachment 124 are mounted to the apparatus 106. Particularly, the coupling attachment 124 can be made to laterally approach the temporary fastener 200 such that the fastener head 202 of the temporary fastener 200 is inserted through the slot 1100 of the attachment cylinder 700 and the opening 900 of the piston coupler 704, and the fastener head 202 is then received within the annular groove 1000 of the piston coupler 704. This way, the piston coupler 704, which is coupled to the piston rod 710, is coupled to the temporary fastener 200.

Figure 14:
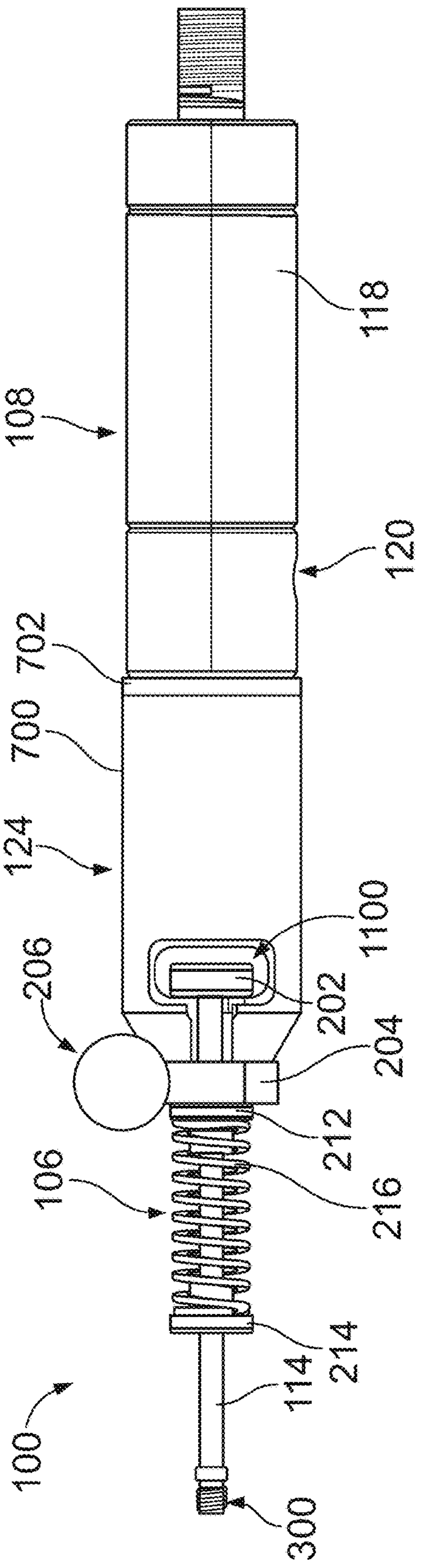
FIG. 14 illustrates a side view of the system of FIG. 1 with the linear actuator and the coupling attachment of FIG. 7 mounted to the apparatus of FIG. 2, in accordance with an example implementation.
Figure 15:
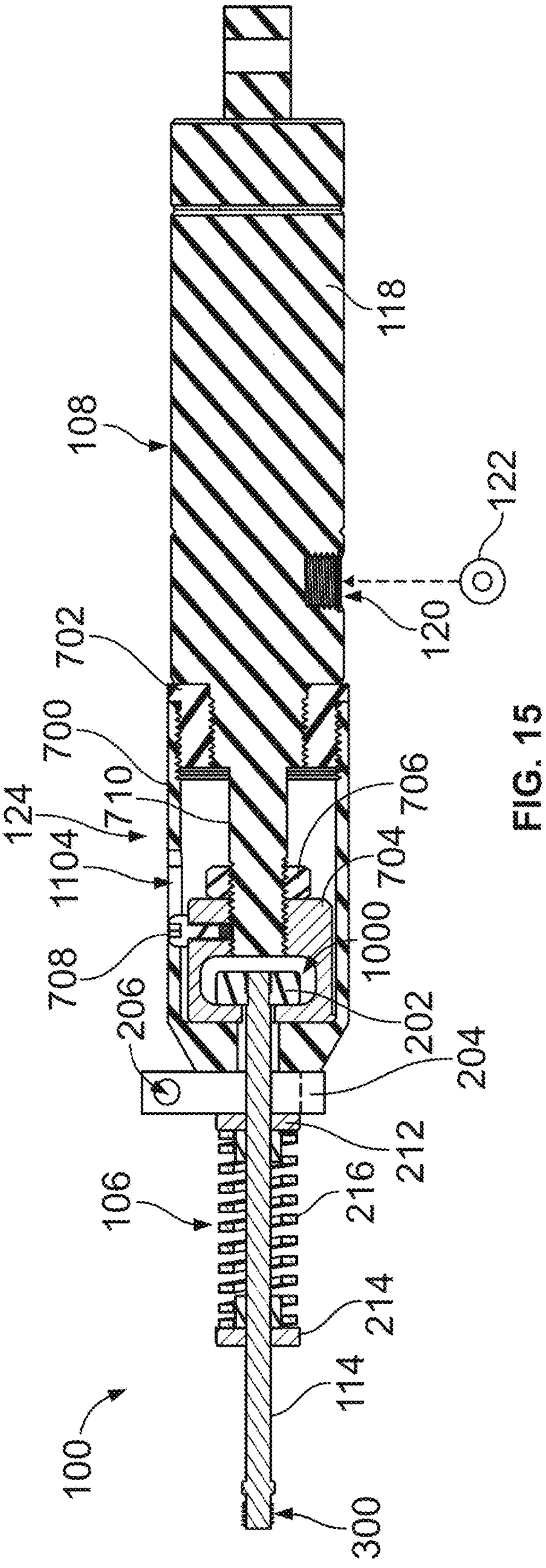
FIG. 15 illustrates a cross-section of the side view of the system of FIG. 14, in accordance with an example implementation.

FIG. 14 illustrates a side view of the system 100 with the linear actuator 108 and the coupling attachment 124 mounted to the apparatus 106, and FIG. 15 illustrates a cross-section of the side view of the system 100 of FIG. 14, in accordance with an example implementation. FIGS. 14-15 do not show the assembly 105 of the panel 102 and the substructure 104 to which the apparatus 106 is mounted to reduce visual clutter in the drawing. However, it should be understood that the stem 114 of the apparatus 106 is mounted through the holes 110, 112, and the fastener retainer element 116 is then used to retain the stem 114 to the assembly 105 of the panel 102 and the substructure 104.

Air can be provided by the source 122 of fluid to the inlet port 120 of the linear actuator 108 at a particular pressure level P. Fluid is then communicated to within the actuator cylinder 118. The air applies a fluid force F on the piston of the linear actuator 108. Assuming that the area of the piston on which the air acts is equal to A, then $F=P\cdot A$.

The piston rod 710 is part of the piston on which the fluid force F is applied. Despite the force being applied to the piston rod 710, the piston rod 710 is precluded from moving. Particularly, the piston rod 710 is engaged with the piston coupler 704, which in turn is coupled to the temporary fastener 200 via the fastener head 202, and the temporary fastener 200 is precluded from moving by the fastener retainer element 116. Thus, the fluid force F is a pulling fluid force applied to the piston rod 710, the temporary fastener 200, the fastener retainer element 116, and the assembly 105 toward the spring 216. The piston rod 710 cannot move when pulled because of the fastener retainer element 116, and thus a reaction force equal in magnitude and opposite in direction to the fluid force F is applied to actuator cylinder 118, thereby causing the actuator cylinder 118 to move longitudinally (e.g., downward in FIG. 1 and to the left in FIGS. 14-15).

The attachment cylinder 700 is coupled to the actuator cylinder 118 via the ring 702, and thus the attachment cylinder 700 also moves therewith toward the yoke 204. The attachment cylinder 700 then applies the force F on the yoke 204, which responsively moves toward the first washer 212 and causes the force to be transmitted to the spring 216 via the first washer 212. As a result, the second washer 214 is pressed against the panel 102, and the spring 216 is compressed under the force F. The assembly 105 is thus clamped between the spring 216 and the fastener retainer element 116.

Figure 16:
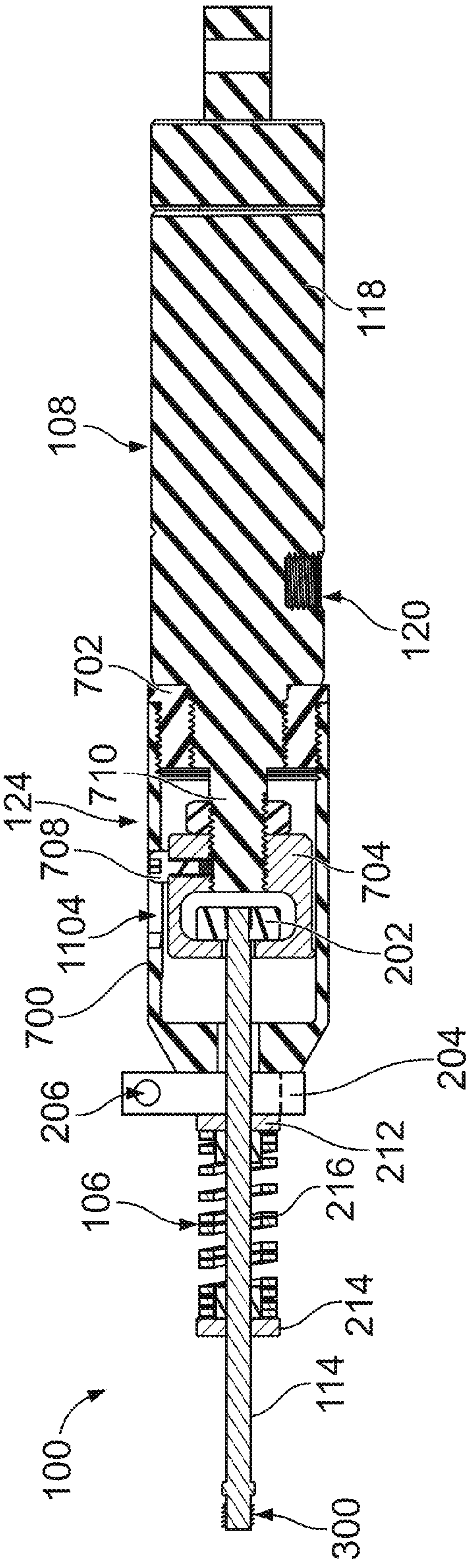
FIG. 16 illustrates a cross-sectional side view of the system of FIG. 15 with a spring of the apparatus of FIG. 2 compressed, in accordance with an example implementation.

FIG. 16 illustrates a cross-sectional side view of the system 100 with the spring 216 compressed, in accordance with an example implementation. As depicted, the attachment cylinder 700 has extend (i.e., moved to the left) and the spring 216 is compressed relative to FIG. 15.

The force F is applied to the panel 102 via the spring 216 as a clamping force. In other words, the assembly 105 of the panel 102 and the substructure 104 is clamped between the second washer 214 (particularly the cylindrical protrusion 604 thereof) and the fastener retainer element 116.

The clamping force applied to the assembly 105 is equal to F, which is a function of the pressure level P. By varying the pressure level P of fluid supplied by the source 122 of fluid, the clamping force can be changed to a particular desired clamping force. The clamping force is not a function of the spring constant of the spring 216.

Once the desired pressure level and clamping force is reached, the spring locking device 215 can be used to secure the spring 216 in the compressed state. Particularly, the thumb screw 206 can be used to lock the yoke 204 and the spring 216 in position by rotating the knob 208 until the yoke 204 securely grips on the stem 114, thereby precluding the yoke 204 from moving longitudinally relative to the stem 114, and thus securing the spring 216 in a compressed state. The source 122 of fluid can then be disconnected, and the linear actuator 108 and the coupling attachment 124 can be removed. For instance, the coupling attachment 124 can be disengaged from the fastener head 202 by laterally moving the coupling attachment 124 and the linear actuator 108 such that the fastener head 202 of the temporary fastener 200 is disengaged or removed from the annular groove 1000, then moved through the opening 900 and the slot 1100.

The assembly 105 of the panel 102 and the substructure 104 can then be checked for gaps while the apparatus 106 applies the predetermined desired clamping force. Once the gap check process is completed, the fastener retainer element 116 can be unthreaded to release the temporary fastener 200 from the holes 110, 112. A permanent fastener can then be used to couple the panel 102 to the substructure 104.

Figure 17:
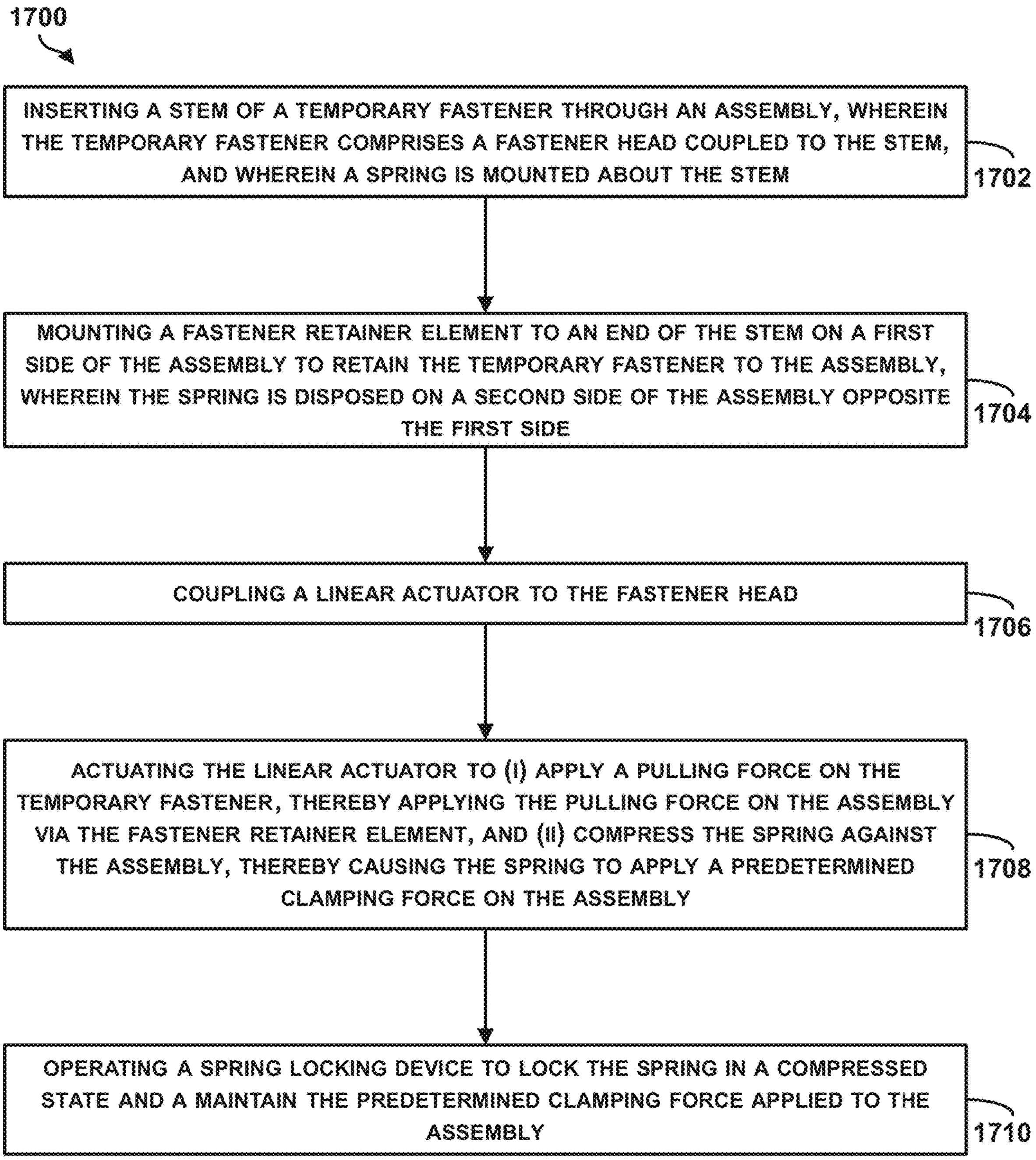
FIG. 17 is a flowchart of a method for installing and removing a temporary fastener to an assembly, in accordance with an example implementation.

FIG. 17 is a flowchart of a method 1700 for installing and removing a temporary fastener to an assembly, in accordance with an example implementation. The method 1700 can, for example, be used with the apparatus 106, linear actuator 108, the coupling attachment 124, and the assembly 105.

The method 1700 may include one or more operations, or actions as illustrated by one or more of blocks 1702-1710, 1800-1808, 1900-1902, 2000-2002, 2100, and 2200. Although the blocks are illustrated in a sequential order, these blocks may also be performed in parallel, and/or in a different order than those described herein. Also, the various blocks may be combined into fewer blocks, divided into additional blocks, and/or removed based upon the desired implementation. It should be understood that for this and other processes and methods disclosed herein, flowcharts show functionality and operation of one possible implementation of present examples. Alternative implementations are included within the scope of the examples of the present disclosure in which functions may be executed out of order from that shown or discussed, including substantially concurrent or in reverse order, depending on the functionality involved, as would be understood by those reasonably skilled in the art.

At block 1702, the method 1700 includes inserting the stem 114 of the temporary fastener 200 through the assembly 105 (e.g., through the holes 110, 112), wherein the temporary fastener 200 comprises the fastener head 202 coupled to the stem 114, and wherein the spring 216 is mounted about the stem 114.

At block 1704, the method 1700 includes mounting the fastener retainer element 116 to an end (e.g., the threaded end 300) of the stem 114 on a first side (e.g., the back side 117) of the assembly 105 to retain the temporary fastener 200 to the assembly 105, wherein the spring 216 is disposed on a second side of the assembly 105 opposite the first side At block 1706, the method 1700 includes coupling the linear actuator 108 to the fastener head 202.

At block 1708, the method 1700 includes actuating the linear actuator 108 to (i) apply a pulling force on the temporary fastener 200, thereby applying the pulling force on the assembly 105 via the fastener retainer element 116, and (ii) compress the spring 216 against the assembly 105, thereby causing the spring 216 to apply a predetermined clamping force on the assembly 105.

At block 1710, the method 1700 includes operating the spring locking device 215 to lock the spring 216 in a compressed state and maintain the predetermined clamping force applied to the assembly 105.

Figure 18:
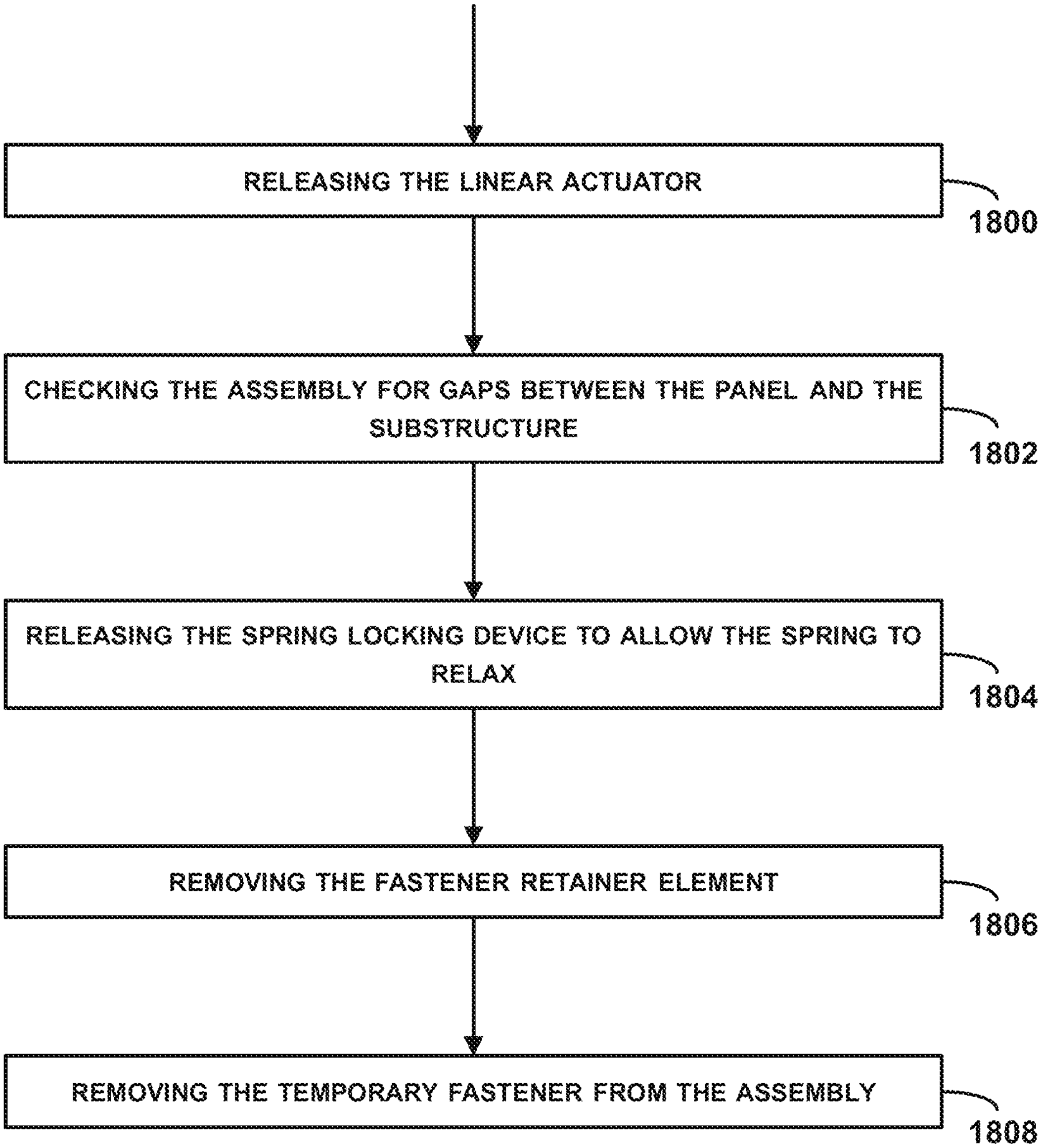
FIG. 18 is a flowchart of additional operations performed with the method of FIG. 17, in accordance with an example implementation.

FIG. 18 is a flowchart of additional operations performed with the method 1700 of FIG. 17, in accordance with an example implementation. In an example, the assembly 105 comprises the panel 102 mounted to the substructure 104. At block 1800, operations include releasing (e.g., removing) the linear actuator 108. At block 1802, operations include checking the assembly 105 for gaps between the panel 102 and the substructure 104. At block 1804, operations include releasing the spring locking device 215 to allow the spring 216 to relax (i.e., allow the spring 216 to be uncompressed). At block 1806, operations include removing the fastener retainer element 116 (unscrewing the fastener retainer element 116). At block 1808, operations include removing the temporary fastener 200 from the assembly 105 (e.g., pulling the stem 114 out of the assembly 105 by pulling the fastener head 202). A permanent fastener can then be installed assuming the assembly passes the quality check.

Figure 19:
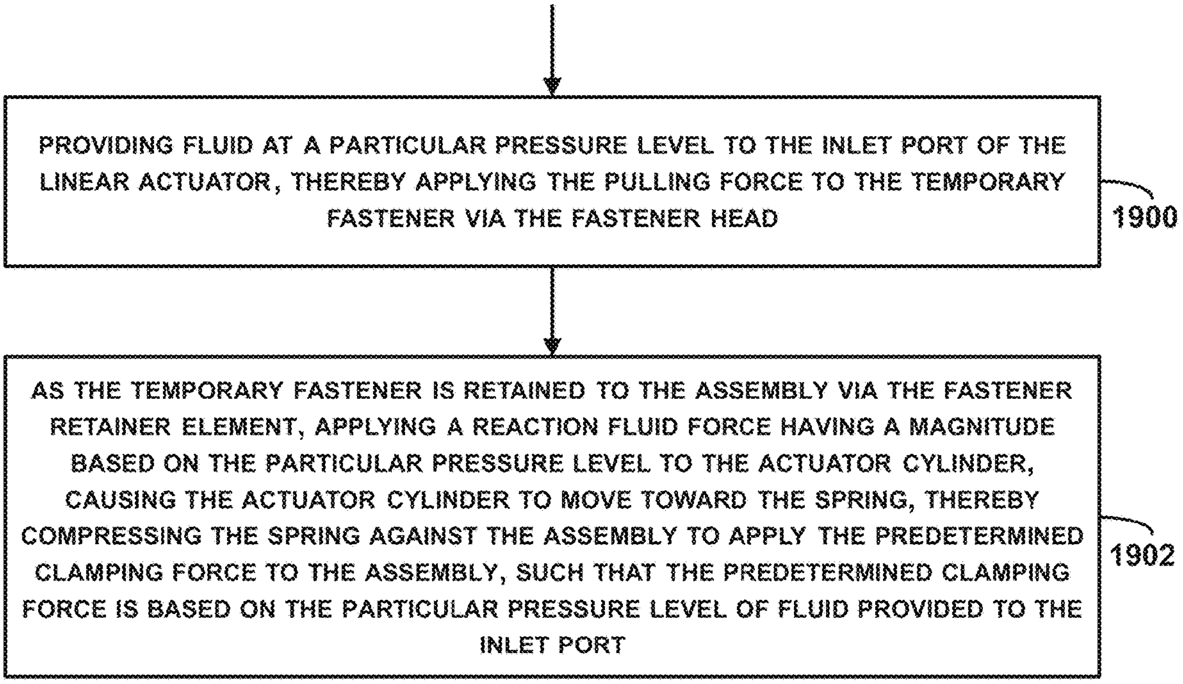
FIG. 19 is a flowchart of additional operations performed with the method of FIG. 17, in accordance with an example implementation.

FIG. 19 is a flowchart of additional operations performed with the method 1700 of FIG. 17, in accordance with an example implementation. In an example, the linear actuator 108 is a fluid-driven actuator comprising the actuator cylinder 118, a piston having the piston rod 710, and the inlet port 120 configured to receive fluid (e.g., from the source 122 of fluid), wherein coupling the linear actuator 108 to the fastener head 202 comprises coupling the fastener head 202 to the piston rod 710 of the linear actuator 108. At block 1900, operations include providing fluid at a particular pressure level to the inlet port 120 of the linear actuator 108, thereby applying the pulling force to the temporary fastener 200 via the fastener head 202. At block 1902, operations include, as the temporary fastener 200 is retained to the assembly 105 via the fastener retainer element 116, applying a reaction fluid force having a magnitude based on the particular pressure level to the actuator cylinder 118, causing the actuator cylinder 118 to move toward the spring 216, thereby compressing the spring 216 against the assembly 105 to apply the predetermined clamping force to the assembly 105, such that the predetermined clamping force is based on the particular pressure level of fluid provided to the inlet port 120.

Figure 20:
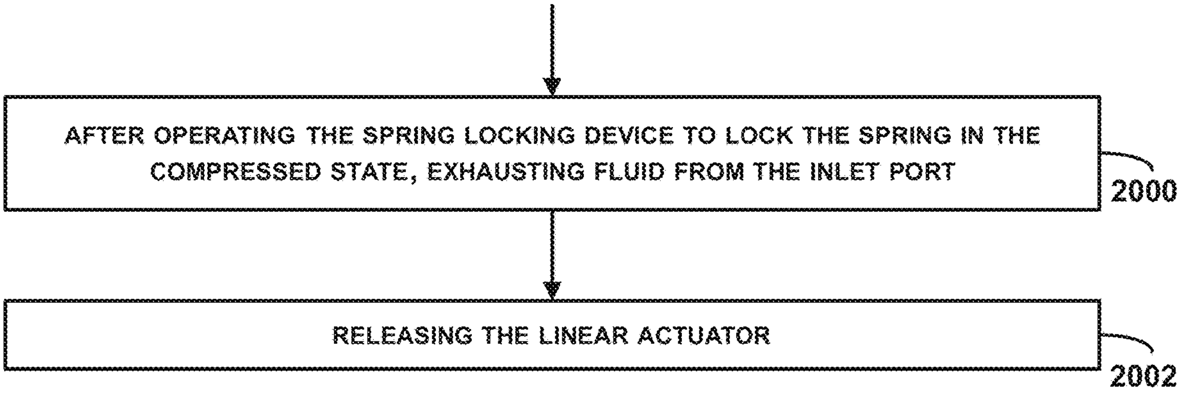
FIG. 20 is a flowchart of additional operations performed with the method of FIG. 17, in accordance with an example implementation.

FIG. 20 is a flowchart of additional operations performed with the method 1700 of FIG. 17, in accordance with an example implementation. At block 2000, operations include, after operating the spring locking device 215 to lock the spring 216 in the compressed state, exhausting fluid from the inlet port 120 (i.e., disconnecting the source 122 from the inlet port 120 and allowing fluid to be released or exhausted from actuator cylinder 118 via the inlet port 120). At block 2002, operations include releasing the linear actuator 108 from the temporary fastener 200 (e.g., disconnecting the linear actuator 108 from the apparatus 106).

FIG. 21 is a flowchart of additional operations performed with the method 1700 of FIG. 17, in accordance with an example implementation. In an example, the spring locking device 215 comprises: (i) the yoke 204 mounted about the stem 114 and interfacing with the spring 216, wherein the linear actuator 108 applies a force on the yoke 204, which responsively moves relative to the stem 114 to transmit the force to the spring 216 to compress the spring 216, and (ii) the thumb screw 206 mounted to the yoke 204. In this example, operating the spring locking device to lock the spring in the compressed state includes, at block 2100, rotating the thumb screw 206 to cause the yoke 204 to grip on the stem 114 and preclude the yoke 204 from moving relative to the stem 114, thereby securing the spring 216 in the compressed state FIG. 22 is a flowchart of additional operations performed with the method 1700 of FIG. 17, in accordance with an example implementation. At block 2200, operations include mounting the coupling attachment 124 to the linear actuator 108, wherein the coupling attachment 124 is configured to couple the temporary fastener 200 to the linear actuator 108, and wherein the linear actuator 108 compresses the spring 216 via the coupling attachment 124 (e.g., via the attachment cylinder 700 acting on the yoke 204, which in turn acts on the spring 216 via the first washer 212).

The detailed description above describes various features and operations of the disclosed systems with reference to the accompanying figures. The illustrative implementations described herein are not meant to be limiting. Certain aspects of the disclosed systems can be arranged and combined in a wide variety of different configurations, all of which are contemplated herein.

Further, unless context suggests otherwise, the features illustrated in each of the figures may be used in combination with one another. Thus, the figures should be generally viewed as component aspects of one or more overall implementations, with the understanding that not all illustrated features are necessary for each implementation.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

Further, devices or systems may be used or configured to perform functions presented in the figures. In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

The arrangements described herein are for purposes of example only. As such, those skilled in the art will appreciate that other arrangements and other elements (e.g., machines, interfaces, operations, orders, and groupings of operations, etc.) can be used instead, and some elements may be omitted altogether according to the desired results. Further, many of the elements that are described are functional entities that may be implemented as discrete or distributed components or in conjunction with other components, in any suitable combination and location.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. Also, the terminology used herein is for the purpose of describing particular implementations only, and is not intended to be limiting.

What is claimed is:

1. A system comprising:

an apparatus comprising:

a temporary fastener having a stem configured to be inserted through an assembly and be retained to the assembly, and a spring mounted about the stem; and a linear actuator configured to apply a force on the spring, thereby causing the spring to be compressed against the assembly and apply a predetermined clamping force to the assembly.

2. The system of claim 1, wherein the linear actuator is a fluid-driven actuator comprising an actuator cylinder, a piston having a piston rod, and an inlet port configured to receive fluid at a particular pressure level, wherein the temporary fastener comprises a fastener head mounted to the stem, and wherein:

the fastener head of the temporary fastener is coupled to the piston rod of the linear actuator, when fluid is provided through the inlet port of the linear actuator, fluid applies a fluid force on the piston, and as the piston rod is coupled to the fastener head mounted to the stem, which is retained to the assembly, a reaction fluid force having a magnitude based on the particular pressure level is applied to the actuator cylinder, causing the actuator cylinder to move toward the spring, thereby compressing the spring to apply the predetermined clamping force to the assembly, such that the predetermined clamping force is based on the particular pressure level of fluid provided to the inlet port.

3. The system of claim 2, further comprising:

a coupling attachment configured to couple the linear actuator to the apparatus, such that when the linear actuator is actuated, the coupling attachment causes the spring to be compressed and apply the predetermined clamping force to the assembly.

4. The system of claim 3, wherein the coupling attachment comprises an attachment cylinder coupled to the actuator cylinder, wherein the piston rod of the linear actuator is disposed partially within the attachment cylinder to be coupled to the fastener head, wherein the reaction fluid force causes the actuator cylinder and the attachment cylinder coupled thereto to move toward the spring, thereby causing the attachment cylinder to compress the spring.

5. The system of claim 4, wherein the attachment cylinder comprises a slot through which the fastener head is inserted to within the attachment cylinder to be coupled to the piston rod.

6. The system of claim 5, wherein the coupling attachment further comprises:

a piston coupler disposed within the attachment cylinder and mounted to the piston rod, wherein the piston coupler comprises a respective slot allowing the fastener head to be received therein, such that the piston coupler couples the temporary fastener to the piston rod.

7. The system of claim 6, wherein the attachment cylinder comprises a longitudinal slot, wherein the coupling attachment further comprises:

a screw mounted through the longitudinal slot of the attachment cylinder and coupled to the piston coupler, wherein the screw is configured as a stop for the attachment cylinder.

8. The system of claim 1, wherein the apparatus further comprises:

a spring locking device configured to secure the spring in a compressed state to maintain the predetermined clamping force.

9. The system of claim 8, wherein the spring locking device comprises:

a yoke mounted about the stem and interfacing with the spring, wherein the linear actuator applies the force on the yoke, which responsively moves relative to the stem to transmit the force to the spring to compress the spring; and a thumb screw mounted to the yoke, wherein after the spring is compressed, the thumb screw is rotated to cause the yoke to grip on the stem and preclude the yoke from moving relative to the stem, thereby securing the spring in the compressed state.

10. The system of claim 9, wherein the apparatus further comprises:

a first washer disposed about the stem and interposed between the yoke and the spring; and a second washer disposed about the stem and configured to be disposed between the spring and the assembly, such that as the yoke moves, the yoke causes the first washer to compress the spring against the second washer mounted to the assembly, thereby applying the predetermined clamping force to the assembly.

11. The system of claim 10, wherein the stem has a threaded end, and wherein the system further comprises:

a fastener retainer element threadedly-engaged with the threaded end of the stem on an opposite side of the assembly relative to the spring, thereby retaining the stem and the temporary fastener to the assembly.

* * * * *